No. 753,313. Patented March 1, 1904.

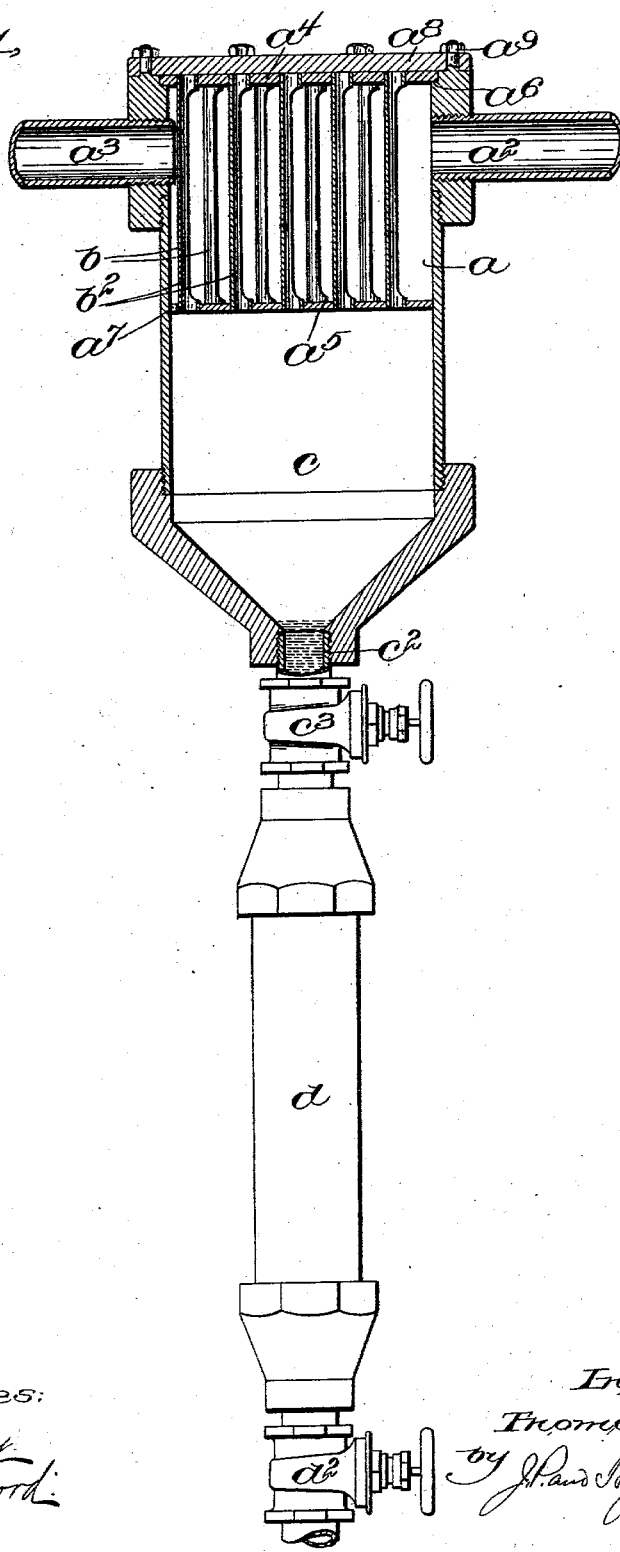

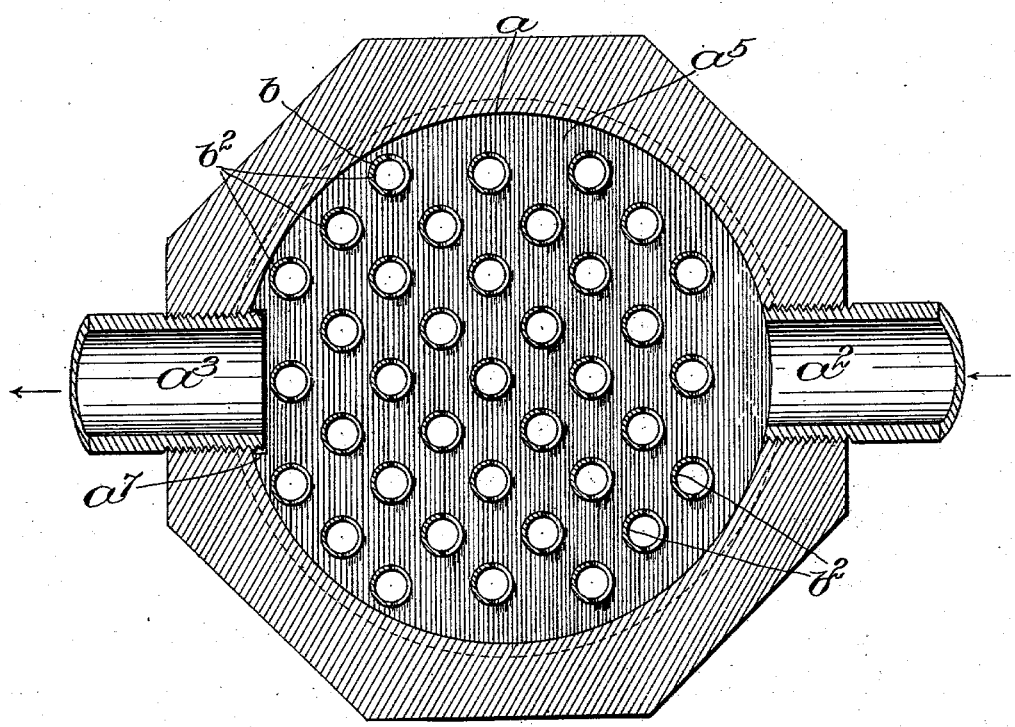

UNITED STATES PATENT OFFICE.

THOMAS H. RAY, OF SOMERVILLE, MASSACHUSETTS.

SEPARATOR.

SPECIFICATION forming part of Letters Patent No. 753,313, dated March 1, 1904.

Application filed October 31, 1901. Serial No. 80,638. (No model.)

*To all whom it may concern:*

Be it known that I, THOMAS H. RAY, of Somerville, county of Middlesex, and State of Massachusetts, have invented an Improvement in Separators, of which the following description, in connection with the accompanying drawings, is a specification, like letters on the drawings representing like parts.

The present invention relates to a separator, the object of the invention being to provide means for separating oil from gas or vapor as the latter is passing through a pipe system of any kind.

The separator embodying the invention is adapted for use in separating oil from ammonia-gas in a refrigerating system, and the form chosen to illustrate the invention is that which has been successfully applied to a system of this kind. In describing the invention, therefore, such a system will be specifically referred to, with the understanding, however, that the invention resides in the construction and arrangement of the separator and is not limited by any special use or application thereof.

In a refrigerating system of this class the oil used in the compressor is to some extent taken up and carried along with the compressed gas, and it has been customary to use a gravity-separator consisting merely of a tank having an inlet for the flowing gas below the top and an outlet for the gas through or near the top, so that the oil carried along will tend to collect in the said tank, from which it is led to an oil-cooler and thence back to the machine where it is used. It has been found in practice, however, that some of the oil will be carried along from the separating-tank by the gas, and it is the object of the present invention to obtain a separator which will completely and effectually separate and return even the small percentage of oil which is carried along by the compressed gas.

The separator embodying the invention is preferably used in addition to the gravity-separator above described, but not necessarily, since in itself it is effectual in completely separating the oil from the gas.

The separator embodying the invention consists of a chamber having an inlet and outlet for the gas at opposite sides of the chamber, and a baffling-surface shown as consisting of a series of concave baffle-plates extending through the chamber between the said inlet and outlet, the concave surfaces being toward the inlet and the baffle-plates being staggered or offset, so as completely to intercept the flowing gas. The channels afforded by the said concave baffle-plates collect the oil which is carried along by the gas and lead to suitable outlets from the chamber, so that the oil will escape from the chamber through the said outlets and may be collected and returned to the point where it is to be used. In the system above described the oil is led back to the oil-cooler or an auxiliary oil-cooler, as the case may be, from which it is returned to the compressor.

A further feature of the invention consists in the combination, with the separator-chamber, of a receptacle or trap for the separated substance, the said trap having suitably-controlled inlet and outlet openings, the former of which may be left open while the latter is closed in order that the separated substance may enter the said trap without permitting the gas to escape therefrom.

To remove the accumulated substance, it is necessary only to close the inlet to the trap and open the outlet therefrom, which can be done without interrupting the use of the system, this being of advantage, especially where a pipe system is employed leading from the plant where the ammonia is converted into liquid form to remote points where the liquefied ammonia is used for refrigerating purposes. With this construction, moreover, the separator can be employed in such systems for the removal of dirt or other foreign substances which may get into the pipes—for example, after repairs have been made or new pipes laid. When the separator, as may sometimes be desirable, is employed for this purpose only, it is not essential that the baffling-surface should consist of the series of concave baffle-plates herein shown, which, however, are especially adapted for the separation of oil.

Figure 1 is a vertical section of a separator embodying the invention; and Fig. 2 a horizontal section, on a larger scale, of the same, taken through the middle of the gas inlet and outlet ducts.

The separator is shown as comprising a chamber $a$, having an inlet $a^2$ and an outlet $a^3$ for the flowing gas, a portion of the gas-passage being shown as pipes screwed into the wall of the chamber at said inlet and outlet, respectively. Within the chamber there is a baffling-surface, shown as consisting of a series of baffle-plates $b$, each having a concave surface $b^2$ turned toward the inlet-passage, the plates being staggered or offset with relation to each other, so that the flowing gas cannot pass through without entering the channels in a number of the said baffle-plates. As a convenient method of construction the said baffle-plates may consist, as shown, of ordinary pipes having a portion of one side cut away, the said pipes being secured at their ends to upper and lower members $a^4$ and $a^5$, which form the top and bottom of the chamber $a$, the lower ends of the pipes extending through the member $a^5$ and affording outlets for the oil, which collects in the channels $b^2$ and flows down by force of gravity. The upper member $a^4$ is shown as resting on an annular shoulder $a^6$, formed around the upper portion of the main wall of the chamber $a$, while the lower member $a^5$ fits within the wall of the said chamber, the system of baffle-plates $b$ thus being supported upon the annular shoulder $a^6$ and being removable endwise from the chamber $a$ for cleaning, inspection, &c. The outlet-pipe is shown as projecting a little way into the chamber in order that any oil which may be carried past the baffle-plates will accumulate on the wall of the chamber $a$ below said pipe and be prevented by the lower wall thereof from being blown up into the outlet. To admit of the removal of the baffle-plate system, the lower member $a^5$ is cut away, as shown at $a^7$, so as to clear the outlet-pipe, the portion cut away also affording an outlet for any oil which may collect on the wall of the chamber and run down. The said system of baffle-plates is held in position by means of a plate $a^8$, secured, as by bolts $a^9$, to the upper surface of the wall of the chamber $a$. To collect the oil, the shell which forms the body of the chamber $a$ is shown as extended below the lower member $a^5$, thus forming a supplemental chamber $c$, which preferably has a conical-shaped lower portion terminating in an oil-outlet, the said oil-outlet being provided with a valve which can be adjusted so as to permit the oil which has collected to escape, at the same time throttling the outlet so as to regulate the escape of the oil and trap a small amount of oil at the bottom of the chamber $c$ and prevent the escape of the gas.

The oil-outlet $c^2$, which has the throttle-valve $c^3$, may communicate with any suitable depository for the oil—as, for example, the oil-cooler in a refrigerating system.

While it is practicable to throttle the oil-outlet, as above described, it is desirable in some cases to provide the separator with a trap or receptacle $d$, which is provided with a suitable outlet, having a cut-off or valve $d^2$, which may be normally closed, so as to prevent escape of the gas and accumulated substance from the trap. The said trap may obviously be cleaned without interrupting the service by closing the throttle-valve $c^3$ and opening the valve $d^2$ in order to remove the accumulated substance from the trap.

While the construction and operation of a refrigerating system has been briefly outlined to assist in the understanding of the invention, it is not deemed necessary to illustrate the details of such system, since the operation of the separator which forms the subject-matter of the invention may be clearly understood without such further illustration.

It is not intended, of course, to limit the invention to the specific construction shown and described nor to the combination of the separator with any particular apparatus or system, since the separator is obviously adapted for divers uses, while the specific construction thereof may be modified without departing from the invention.

I claim—

1. A separator comprising a vertical cylindrical chamber provided with lateral inlet and outlet tubes, the outlet-tube projecting into the chamber beyond the wall thereof; a series of baffle-plates extending longitudinally through said chamber and secured in upper and lower plates, the lower plate substantially fitting the wall of the chamber and having an outlet-opening for each baffle-plate and a recess below the inlet-tube, and a shoulder to support the upper plate, the baffle-plate system thus being bodily removable from the chamber, as set forth.

2. A separator comprising a chamber having a gas-inlet and a gas-outlet; a series of baffle-plates consisting of pipes cut away at the sides, said pipes extending through and being secured in upper and lower plates or members, the lower member fitting the wall of the chamber; an annular shoulder formed near the top of said wall to support the upper plate or member; and means for securing said upper plate or member on said annular shoulder, as set forth.

In testimony whereof I have signed my name to this specification in the presence of two subscribing witnesses.

THOMAS H. RAY.

Witnesses:
 HENRY J. LIVERMORE,
 NANCY P. FORD.